(12) United States Patent
Casaccia

(10) Patent No.: US 7,079,492 B1
(45) Date of Patent: Jul. 18, 2006

(54) SYSTEM, METHOD, AND APPARATUS FOR ACCESS CHANNEL TRAFFIC MANAGEMENT

(75) Inventor: Lorenzo Casaccia, Frassineto (IT)

(73) Assignee: Qualcomm, Incorporated, San Diego, CA (US)

( * ) Notice: Subject to any disclaimer, the term of this patent is extended or adjusted under 35 U.S.C. 154(b) by 958 days.

(21) Appl. No.: 09/606,784

(22) Filed: Jun. 28, 2000

(51) Int. Cl.
*H04B 7/212* (2006.01)
*H04J 3/14* (2006.01)
*H04L 12/40* (2006.01)

(52) U.S. Cl. ............ 370/252; 370/348; 370/439; 370/443

(58) Field of Classification Search ........... 370/329, 370/341, 431, 453, 252, 348, 439, 443
See application file for complete search history.

(56) References Cited

U.S. PATENT DOCUMENTS

| | | | | |
|---|---|---|---|---|
| 4,736,371 A | * | 4/1988 | Tejima et al. ............ | 370/236 |
| 5,481,537 A | * | 1/1996 | Crisler et al. ............ | 370/437 |
| 5,673,259 A | | 9/1997 | Quick, Jr. | |
| 5,931,964 A | * | 8/1999 | Beming et al. ............ | 714/748 |
| 6,078,568 A | * | 6/2000 | Wright et al. ............ | 370/312 |
| 6,122,514 A | * | 9/2000 | Spaur et al. ............ | 455/448 |
| 6,240,083 B1 | * | 5/2001 | Wright et al. ............ | 370/348 |
| 6,256,301 B1 | * | 7/2001 | Tiedemann et al. ......... | 370/342 |
| 6,404,756 B1 | * | 6/2002 | Whitehill et al. ........... | 370/338 |
| 6,633,558 B1 | * | 10/2003 | Cho et al. .................... | 370/348 |
| 6,788,937 B1 | * | 9/2004 | Willenegger et al. ....... | 455/434 |

FOREIGN PATENT DOCUMENTS

| | | |
|---|---|---|
| EP | 0524675 | 1/1993 |
| EP | 0524675 A1 | 1/1993 |
| EP | 0765096 | 3/1997 |
| EP | 0765096 A2 | 3/1997 |
| EP | 0973298 | 1/2000 |
| EP | 0973298 A2 | 1/2000 |
| WO | 98/37669 | 8/1998 |
| WO | 9837669 | 8/1998 |

* cited by examiner

*Primary Examiner*—Alpus H. Hsu
(74) *Attorney, Agent, or Firm*—Philip R. Wadsworth; Thien T. Nguyen; George J. Oehling

(57) ABSTRACT

In a system, method, and apparatus according to an embodiment of the invention, traffic on a basic access channel and a reserved access channel is managed to maximize use of the basic access channel while minimizing delays.

18 Claims, 10 Drawing Sheets

SYSTEM, METHOD, AND APPARATUS FOR ACCESS CHANNEL TRAFFIC MANAGEMENT

BACKGROUND OF THE INVENTION

1. Field of the Invention

This invention relates to traffic management in communications systems. More specifically, this invention relates to management of access channel traffic in a communications system.

2. Background and Related Art

A communications system comprises a communications network and a set of nodes that communicate with the network. The communications links between the network and the nodes may be wired and/or wireless. The network may also communicate with other networks, such that a node may communicate with an entity within the network, with another node connected to the network, and/or with an entity and/or a node on another network.

One example of a communications network is a local-area network (LAN), where the network may include a set of servers and the individual nodes may include workstations, personal computers, and/or peripheral devices such as storage units and printers. Another example of a communications network is a wireless network for cellular communications, where the network may include a set of base stations and administrative units (such as mobile service controllers (MSCs) and location registers) and the individual nodes may be mobile units that communicate with the base stations over a radiolink. A mobile unit may be a cellular telephone, a wireless modem connected to a computer or other data-generating device, or a wireless local loop (WLL) station. Through the base stations, the mobile units may communicate with each other and/or with devices on other networks such as the Internet and/or the public switched telephone network (PSTN).

As shown in FIG. 1, a number of nodes 100 may transmit information to a network 200 over a common channel 250. In a local-area network, for example, several workstations or personal computers may attempt to send information to the network across the same Ethernet connection. In a system for mobile wireless communications, such as a cellular telephone system, several users may attempt to gain access to the network at the same time by sending access requests over a common access channel (e.g. according to an ALOHA scheme). When transmissions from two or more users are received by the network over the same channel at the same time, a data collision may result, which prevents any of the transmissions from being received correctly. As a consequence, the colliding transmissions must be retransmitted separately until each one has been received correctly, thereby increasing channel traffic and causing system delays.

It is possible for a node transmitting over a wired link to receive information regarding a data collision as it occurs. For a typical node transmitting over a wireless link, however, meaningful information concerning current channel use may be obtained only indirectly from the network. Moreover, such information is typically received only in the negative, such as in the form of a timeout (i.e., a failure to receive acknowledgement of the transmission within a specified time period). Due at least in part to this feedback delay, data collisions caused by channel overuse become even more costly in wireless systems.

Systems using ALOHA schemes are particularly susceptible to data collisions. This susceptibility may be reduced somewhat by implementing a slotted ALOHA scheme instead. Under a slotted ALOHA scheme, time is divided into a series of adjacent and non-overlapping slots, and the nodes are constrained to begin transmissions only at slot boundaries.

It may be desirable to support messages of different lengths over a common channel. In a slotted ALOHA system, for example, it may be desirable to support messages that occupy several consecutive slots. Such a modification increases the complexity of the system, however, and susceptibility to collisions increases with message length.

One alternative to a single, collision-prone access channel is a reserved access channel, which a node may use only during slots it has reserved in advance. In the IS-2000 CDMA system, for example, each reverse link enhanced access channel may be designated to be either a basic access channel (i.e., slotted ALOHA) or a reserved access channel. FIG. 2 shows a block diagram of an exemplary system having a basic access channel 252a and a reserved access channel 252b on the reverse link.

While implementing a reservation mode on an access channel eliminates the possibility of collisions on that channel, negotiation of the reservation creates delays and extra channel traffic. Additionally, a node must then wait for its reserved slot(s) to arrive. Therefore, it is desirable to transmit as many messages as possible using a basic access channel. At the same time, it is desirable to manage traffic between several access channels (e.g., between channels 252a and 252b in FIG. 2) in such a way as to minimize delays.

DETAILED DESCRIPTION OF THE INVENTION

Figure 1:
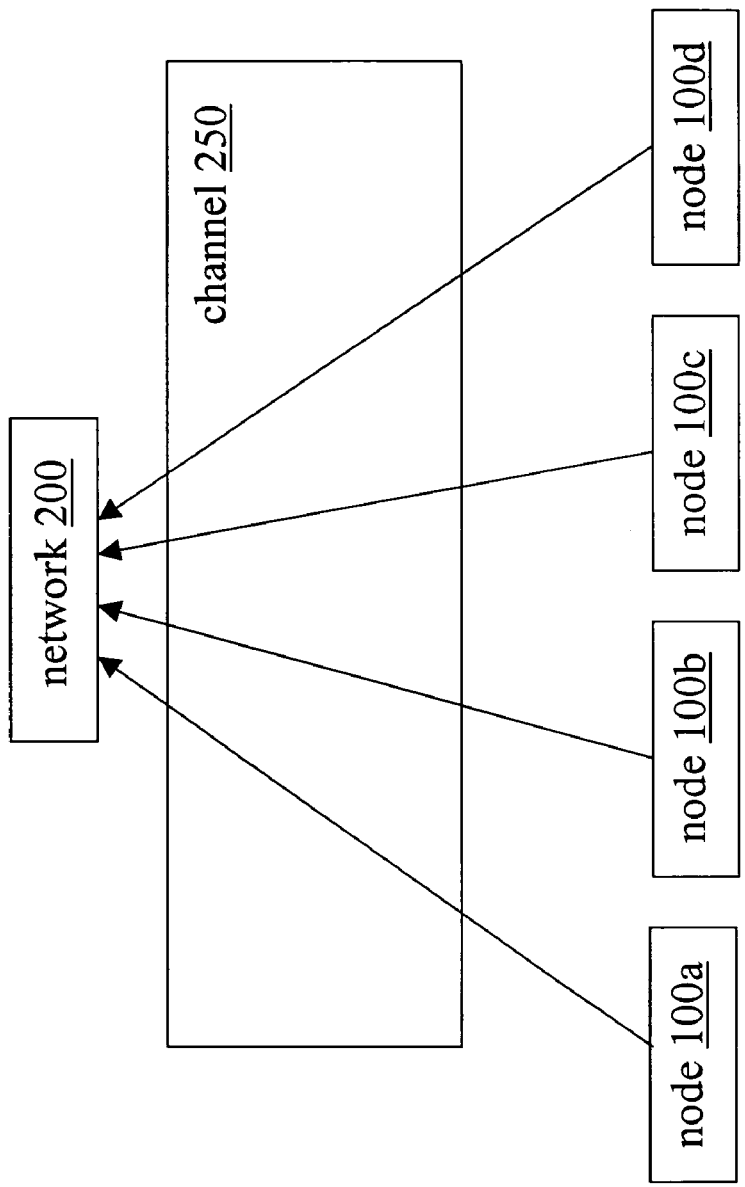
FIG. 1 is a block diagram of a communications system.
Figure 2:
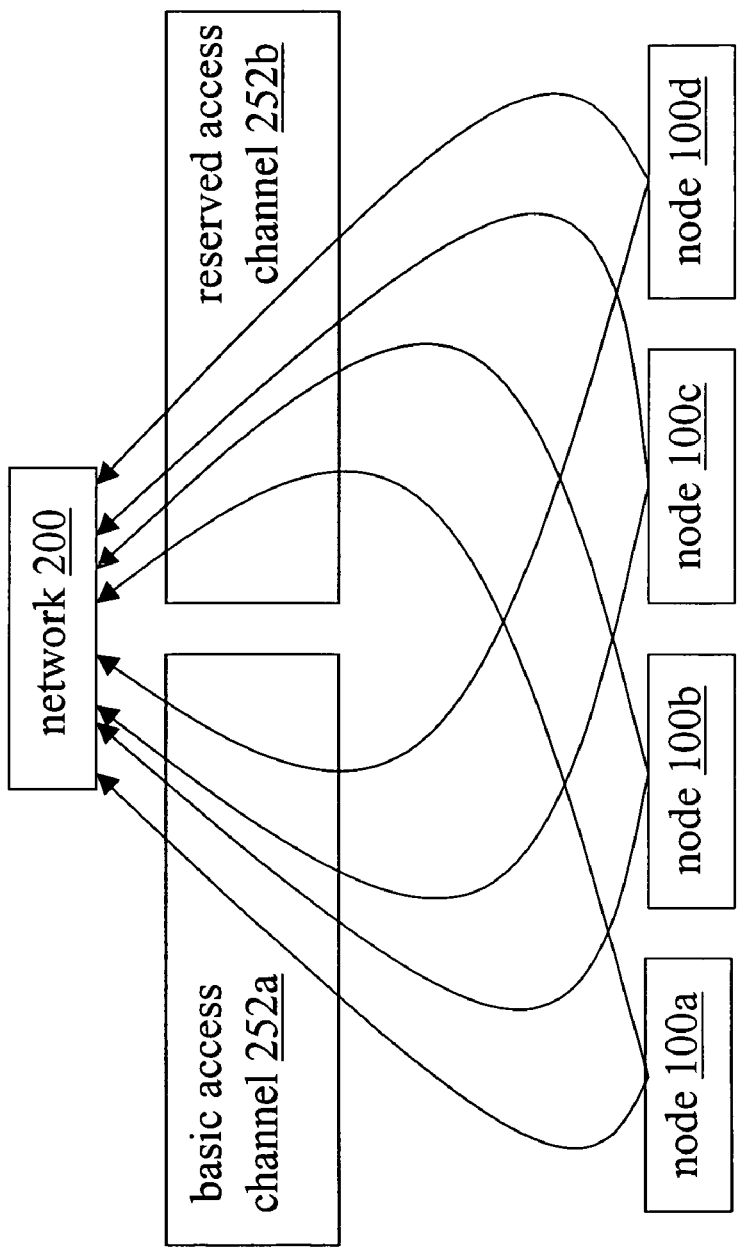
FIG. 2 is a block diagram of a communications system having a basic access channel and a reserved access channel on the reverse link.
Figure 3:
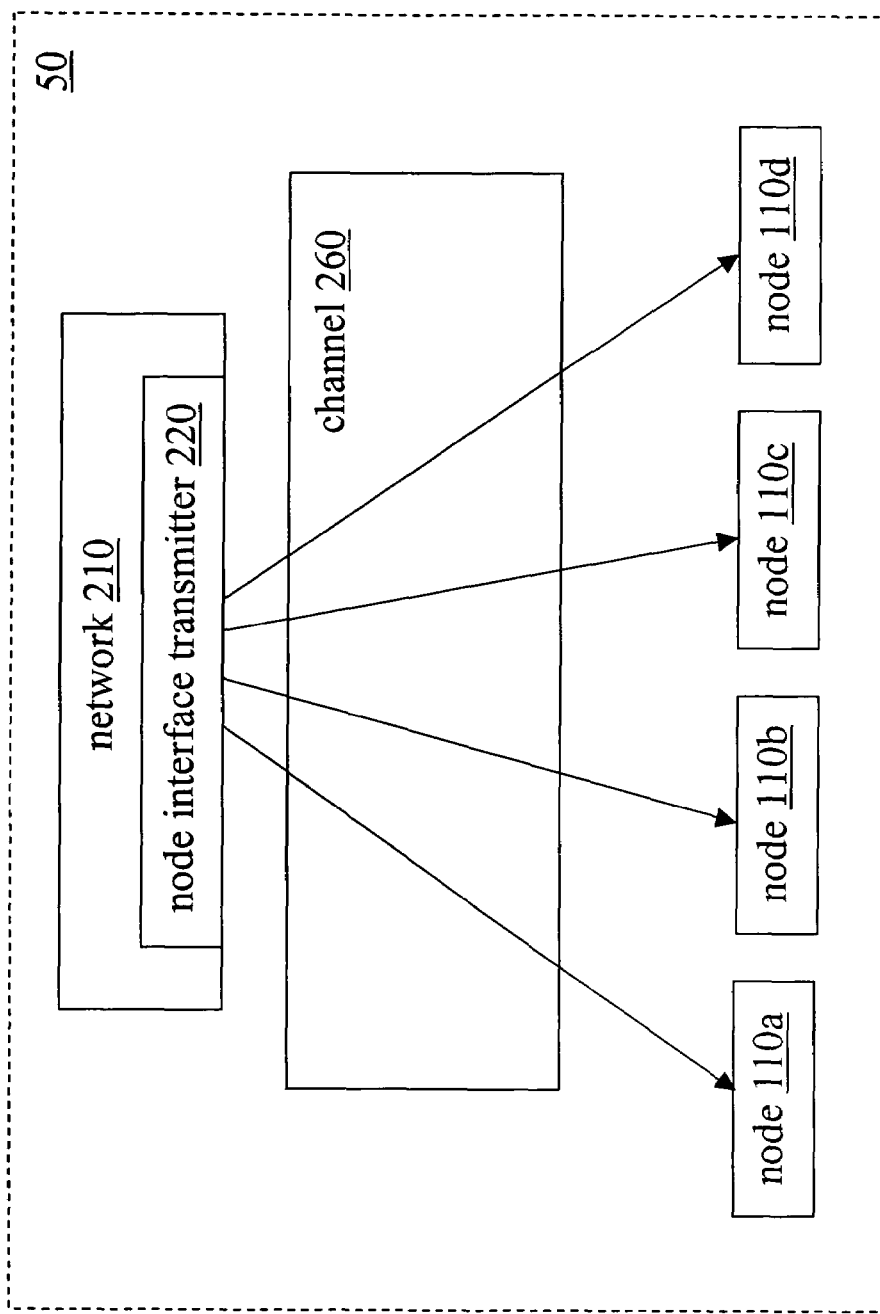
FIG. 3 is a block diagram of a system according to an embodiment of the invention.

FIG. 3 shows a system 50 according to an embodiment of the invention wherein node interface transmitter 220 of network 210 transmits parameters for distributed control to nodes 110 over a forward link channel 260. In an exemplary implementation of system 50, nodes 110 are mobile units of a cellular telephone system, and node interface transmitter 220 is a base station of the central telephone system or a portion thereof, which transmits the parameters for distributed control over a control channel such as a paging channel.

Figure 4:
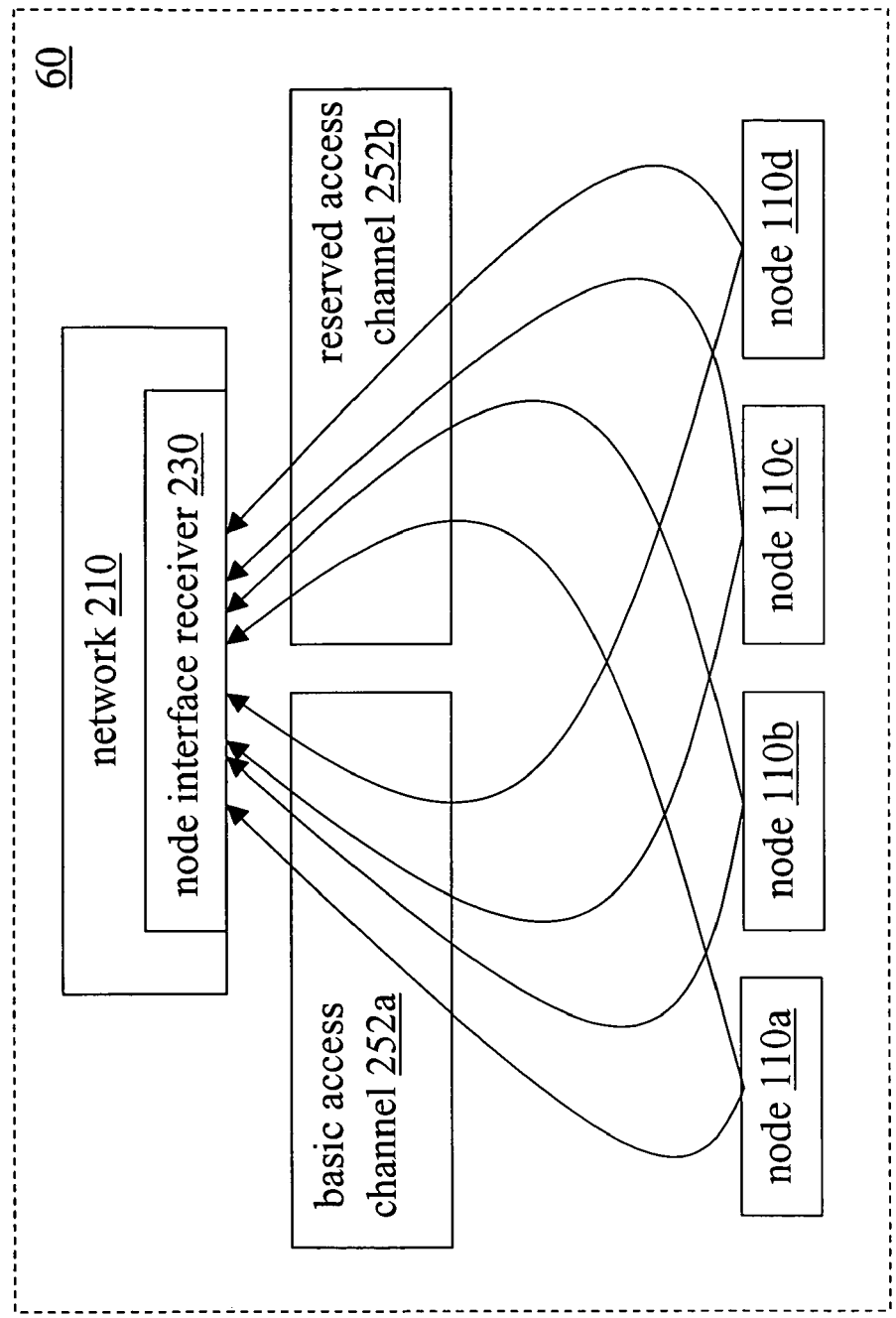
FIG. 4 is a block diagram of a system according to an embodiment of the invention.
Figure 4B:
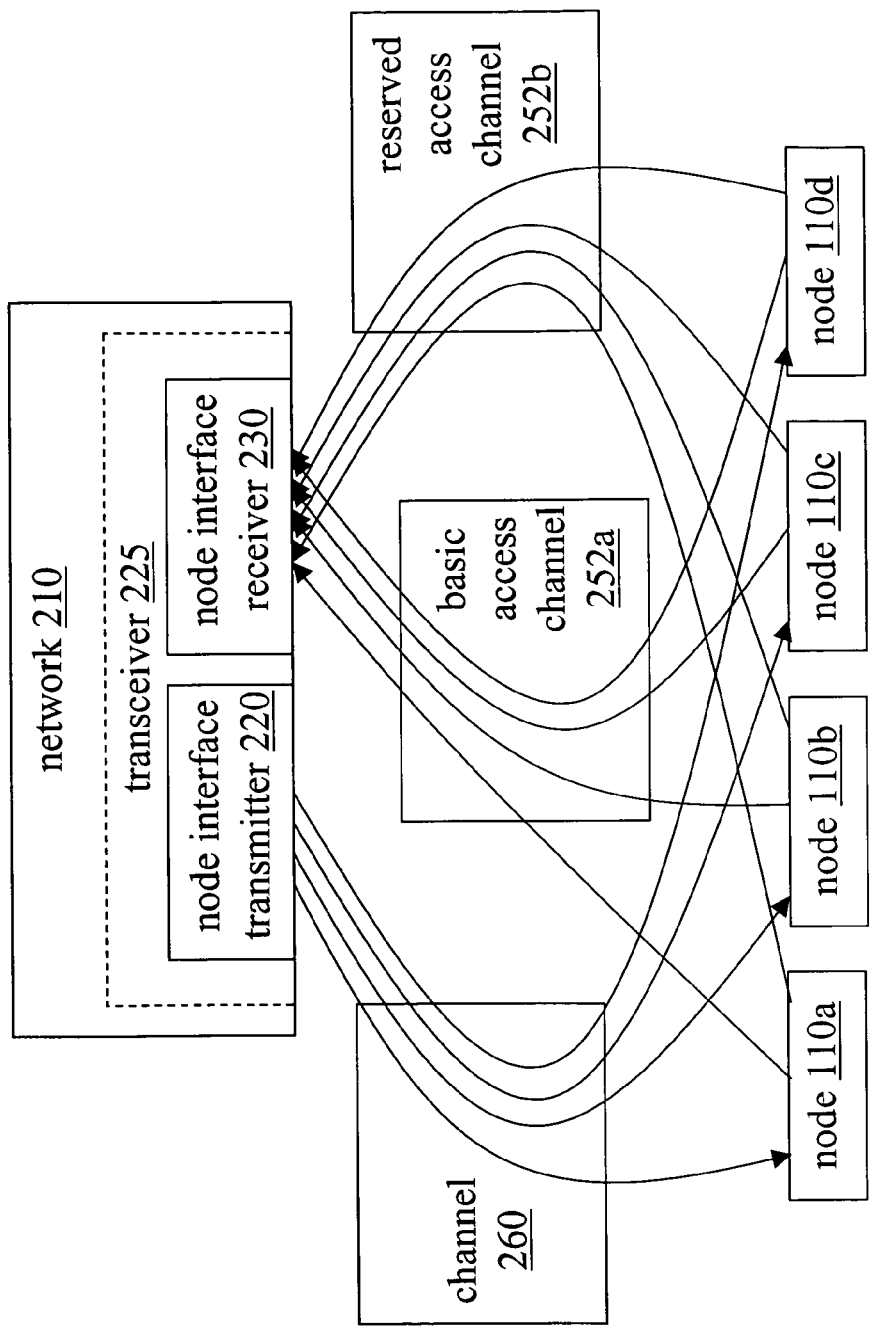
FIG. 4B is a block diagram of a system according to an embodiment of the invention.

FIG. 4 shows a system 60 according to an embodiment of the invention where nodes 110 transmit messages to node interface receiver 230 of network 210 over basic access channel 252a or reserved access channel 252b. In an exemplary implementation, systems 50 and 60 overlap at nodes 110 and network 210, with node interface transmitter 220 and receiver 230 being portions of the same base station or transceiver 225 (e.g. as shown in FIG. 4B). For each message it transmits to network 210, a node 110 in this implementation chooses to transmit the message over either basic access channel 252a or reserved access channel 252b, where this choice is made at least in part according to the parameters for distributed control.

Figure 5:
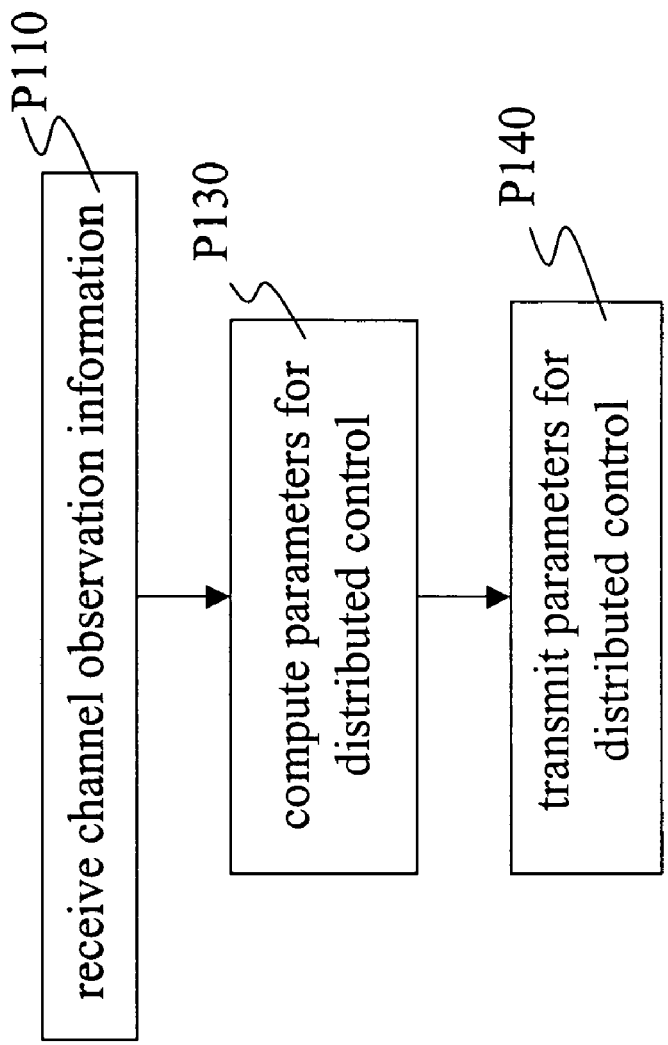
FIG. 5 is a flow chart for a method according to an embodiment of the invention.

FIG. 5 shows a method according to an embodiment of the invention that may be performed by a node interface transmitter 220 as shown in FIG. 3. In task P110, node interface transmitter 220 receives reverse link channel observation information (i.e. information that relates to a current or recent state of reverse link channel 252a and/or 252b). This information may be received from node interface receiver 230 or, more generally, from a receiver portion of a transceiver 225 that includes node interface transmitter 220, although neither system 50 nor the method of FIG. 4 are limited to such a configuration. The reverse link channel observation information may indicate, for example, whether reverse link channel 252a was idle during the most recent slot period, or was in collision, or successfully conveyed message data to network 210.

In task P130, parameters for distributed control are computed based at least in part on the channel observation information. This task may be performed by node interface transmitter 220 or by another part of network 210. The parameters for distributed control may include one or more distribution parameters (relating to decisions such as whether to transmit messages over reverse link channel 252a or 252b) and/or one or more persistence parameters (relating to decisions such as if and when to initiate retransmission of messages whose transmissions were unsuccessful, e.g. due to collision). In task P140, the parameters for distributed control are transmitted (e.g. over forward link channel 260).

Figure 6:
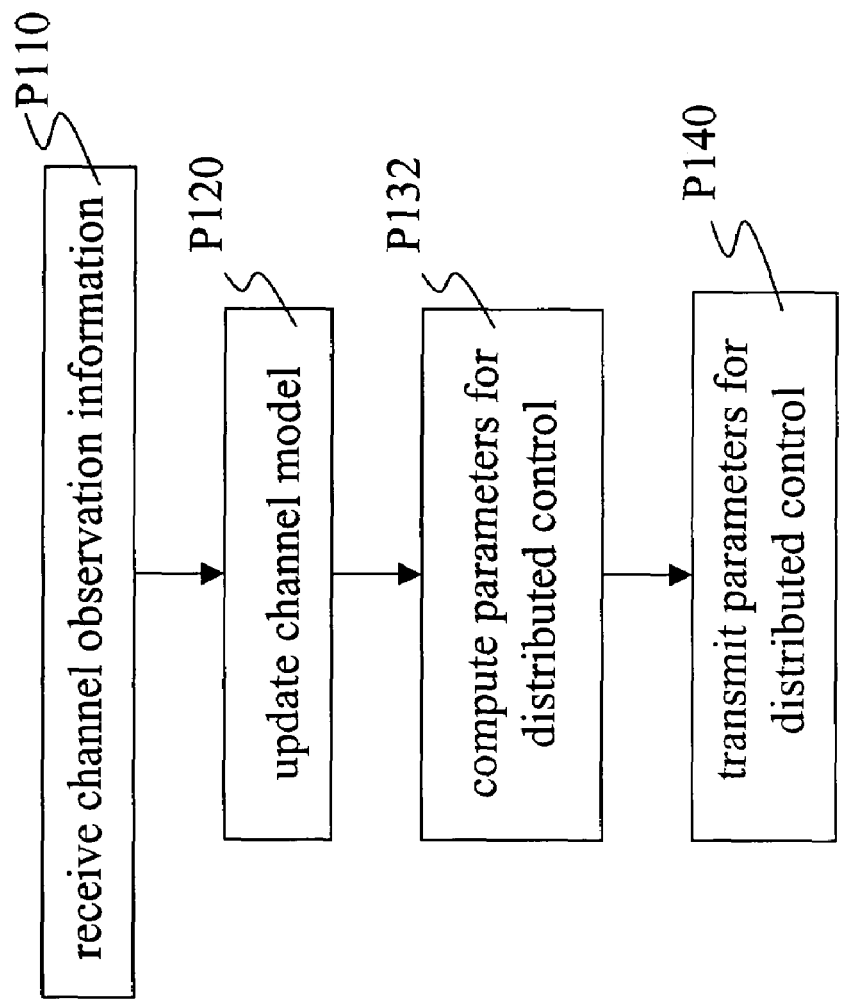
FIG. 6 is a flow chart for a method according to an embodiment of the invention.

FIG. 6 shows a method according to an alternate embodiment of the invention. In task P120 of this method, a channel model is updated at least in part according to the channel observation information. This model may be maintained within node interface transmitter 220 or within another part of network 210. In task P132, the parameters for distributed control are computed based at least in part on the updated channel model.

Figure 7:
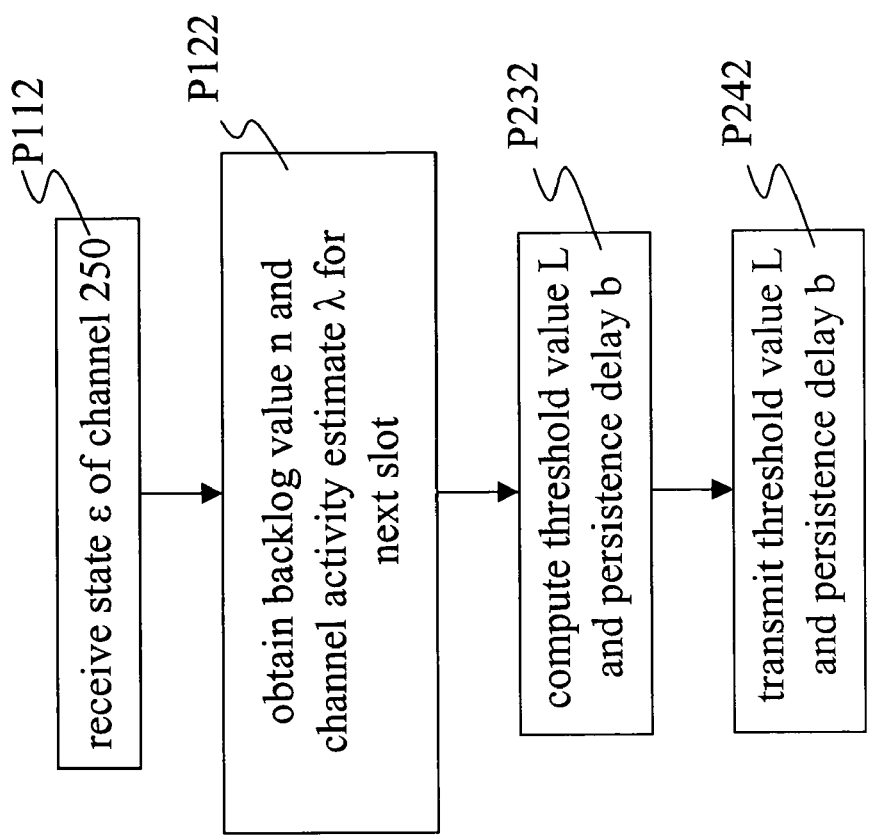
FIG. 7 is a flow chart for a method according to an embodiment of the invention.

FIG. 7 shows a particular implementation of the method of FIG. 6. In task P112, a value is determined for a state $\varepsilon$ of channel 252a during the most recent slot (denoted as slot i, where a first slot in a sequence is designated as slot 0). In this implementation, state $\varepsilon$ may have a value of +1 (indicating a successful reception of message data during slot i), −1 (indicating a data collision during slot i), or 0 (indicating that channel 252a was idle during slot i).

In task P122, the value of $\varepsilon$ is used to update a model for channel 252a during the next slot in time (denoted as slot (i+1)). In a particular implementation, this model includes a backlog value $n_{i+1}$ and a channel activity estimate $\lambda_{i+1}$. Backlog value n relates to backlogged messages (i.e., messages that were involved in collisions and have yet to be successfully retransmitted). In an exemplary implementation, the backlog value $n_{i+1}$ represents the number of nodes having backlogged messages during slot (i+1) and is expressed as follows:

$$n_0 = 0,$$

$$n_{i+1} = n_i + \begin{cases} -\dfrac{\alpha}{\lambda_i + \alpha}, & \varepsilon = +1 \\ 0, & \varepsilon = 0 \\ \dfrac{\lambda_i}{1 - \dfrac{\lambda_i + \alpha}{e^{\lambda_i + \alpha} - 1}}, & \varepsilon = -1 \end{cases},$$

where $\lambda_i$ is a channel activity estimate (described below) for slot i and $\alpha$ is a factor used to adjust retransmission probability b (also described below). It may be demonstrated that choosing a value of $1-\lambda_i$ for the parameter $\alpha$ will optimize the average delay. In this case, the expression above may be rewritten as $$n_{i+1} = n_i + \begin{cases} \lambda_i - 1, & \varepsilon = +1 \\ 0, & \varepsilon = 0 \\ 2.392 \cdot \lambda_1, & \varepsilon = -1 \end{cases}.$$

It will generally be desirable to constrain backlog value n to have a non-negative value.

Task P122 also includes calculation of a value $\lambda$ that provides an estimate of the activity over channel 252a. In an exemplary implementation, the value $\lambda_{i+1}$ is calculated as the normalized sum of backlog value $n_{i+1}$, a history $h_i$, and an initial value $\lambda_0$:

$$\lambda_{i+1} = \frac{1}{i+1} \cdot [n_{i+1} + h_i + \lambda_0],$$

where the history $h_i$ is maintained as the running total of slots (up to and including slot i) where reception was successful (i.e., in which $\varepsilon$ equaled +1). If $\alpha$ is chosen to have the value $1-\lambda_i$, then the limit of $\lambda$ as i increases will be bounded at least by 0 and 1. Therefore, one suitable choice for initial value $\lambda_0$ is 0.5. However, the initial value choice is not too important in this case, as the value of $\lambda$ tends to converge quickly in operation. If the method is to be restarted (i.e. the value of i is to be reset to zero), it may be desirable to store the final value of $\lambda$ for use as the initial value $\lambda_0$ upon restarting.

In task P232, the backlog and channel values $n_{i+1}$ and $\lambda_{i+1}$ are used to compute a message length threshold L. The probability of a successful transmission of a message of length 1 slot may be denoted as P(S|1). In an exemplary implementation, it is assumed that node interface receiver 230 regards each slot individually as busy or free, independently of its observation of other slots, and that the probability of a successful transmission of a message of length N slots P(S|N) may therefore be expressed as:

$$P(S|N) = P(S|1)^N.$$

It is also assumed that the number of new users in a slot (i.e., users who are transmitting fresh and not backlogged messages) follows a Poisson distribution with parameter $\lambda$:

$$P(p \text{ new users transmitting}) = \lambda^p \frac{e^{-\lambda}}{p!}.$$

Further, the number of users transmitting backlogged messages in a slot is assumed to be distributed as follows:

$$p(q \text{ backlogged users transmitting}) = \binom{n}{q}(1-b)^{n-q}b^q,$$

where n is the backlog value for the slot and b is a probability of retransmission (discussed below). Therefore, it can be seen that P(S|1) will be related to the following event:

P(0 backlogged users and 1 new user transmitting)=
$e^{-\lambda}(1-b)^n$.

Adding a channel quality factor Q to account for channel conditions such as fading and shadowing (where Q may have a fixed value such as 0.99 or a dynamic value $\leq 1$), we have the following expression for the probability of a successful transmission of a message of length 1 slot:

$P(S|1)=e^{-\lambda}(1-b)^n Q$.

A minimum bound d on the probability of successful transmission of a message over reverse link channel 252a is chosen as a system parameter. A threshold L which indicates the maximum length of a message whose probability of being successfully transmitted satisfies the minimum bound d may be expressed as:

$$L < \frac{\log(d)}{\log(P(S \mid 1))}.$$

In an exemplary implementation, the message length threshold L is expressed as follows:

$$L = ceil\left(\frac{\log(d)}{n_{i+1} \cdot \log(1-b) - \ddot{e}_{i+1} + \log(Q)}\right).$$

Retransmission probability b may be expressed in terms of L and other parameters described above as follows:

$$b = \min\left(\frac{2}{L+1} \cdot \min\left(\beta, \frac{\alpha}{n_{i+1}}\right), 0.5\right),$$

where parameter β may be assigned the value 0.5. Alternatively, a value of $(1-(\lambda/2)-\lambda)$ may be chosen for parameter β in order to maximize the probability of a successful transmission when there is one backlogged user (i.e. when $n_{i+1}=1$). In this expression, the term 2/(L+1) is a scale factor that accounts for the average length of messages permitted on the channel to which L relates (i.e. (L+1)/2).

The assumptions, models, and estimates described above have been found to correspond well with the conditions of a dynamic communications environment, in which nodes may change between active and inactive states and/or may enter or leave the system. In a more static or constrained environment, it may not be necessary to estimate such quantities as backlog or channel activity, as more or less exact values may be available. Additionally, other assumptions may provide better estimates under different conditions (e.g. an environment in which activity by more than one node is correlated with some event).

With respect to the criterion of minimizing average delay, it can be demonstrated that the choice of L and b as described above is optimal. For a particular application, however, it may be desirable to achieve optimization with respect to maximum throughput instead. In an alternative implementation, L may be expressed as follows:

$$L = ceil\left(\frac{\log(d)}{n_{i+1} \cdot \log(1-b) - \ddot{e}_{i+1} + \log(Q)} + V\right),$$

where V is a correction value expressed as follows:

$$V = \begin{cases} 2, & D < 0.05 \\ 1.5, & 0.05 \leq D < 0.1 \\ 0.75, & 0.1 \leq D < 0.15 \\ 0 & \text{otherwise} \end{cases}$$

and D is a reverse link load estimate (calculated before L is updated) that is expressed as follows:

$$D = \frac{2\lambda_{i+1}L_{MAX}}{L^2 + L},$$

where $L_{MAX}$ is a maximum message length of system 60. While this implementation yields a higher throughput, it tends to produce longer delays as well. Many other tradeoffs between delay and throughput are also possible.

In task P242, distribution parameter L and persistence parameter b are transmitted (e.g. to nodes 110). Note that tasks P112, P122, P232, and P242 need not be performed with the same frequency, although it will usually be desirable to perform each succeeding task no more frequently than the task it follows. For example, it may be desirable to perform task P112 at each slot in order to maintain an accurate history of the channel. At the same time, it may be desirable to perform task P242 less frequently (e.g. only every 25 slots or so, or only in response to a predetermined event) in order to minimize channel overhead. It may also be desirable to perform different parts of task P242 at different intervals (e.g. to update parameters L and b at different frequencies).

In the implementations described above, a single value for L and for b is transmitted by node interface transmitter 230 to all nodes 110. In alternative implementations, the expressions presented above may be changed to allow different values of L and/or b to be transmitted to different subsets of the nodes 110. Alternatively, a node 110 may apply a factor such that the node uses an altered version of the received value of L and/or b in its channel selection decision, where such factor may be known to network 210 and may be fixed or dynamic.

Figure 8:
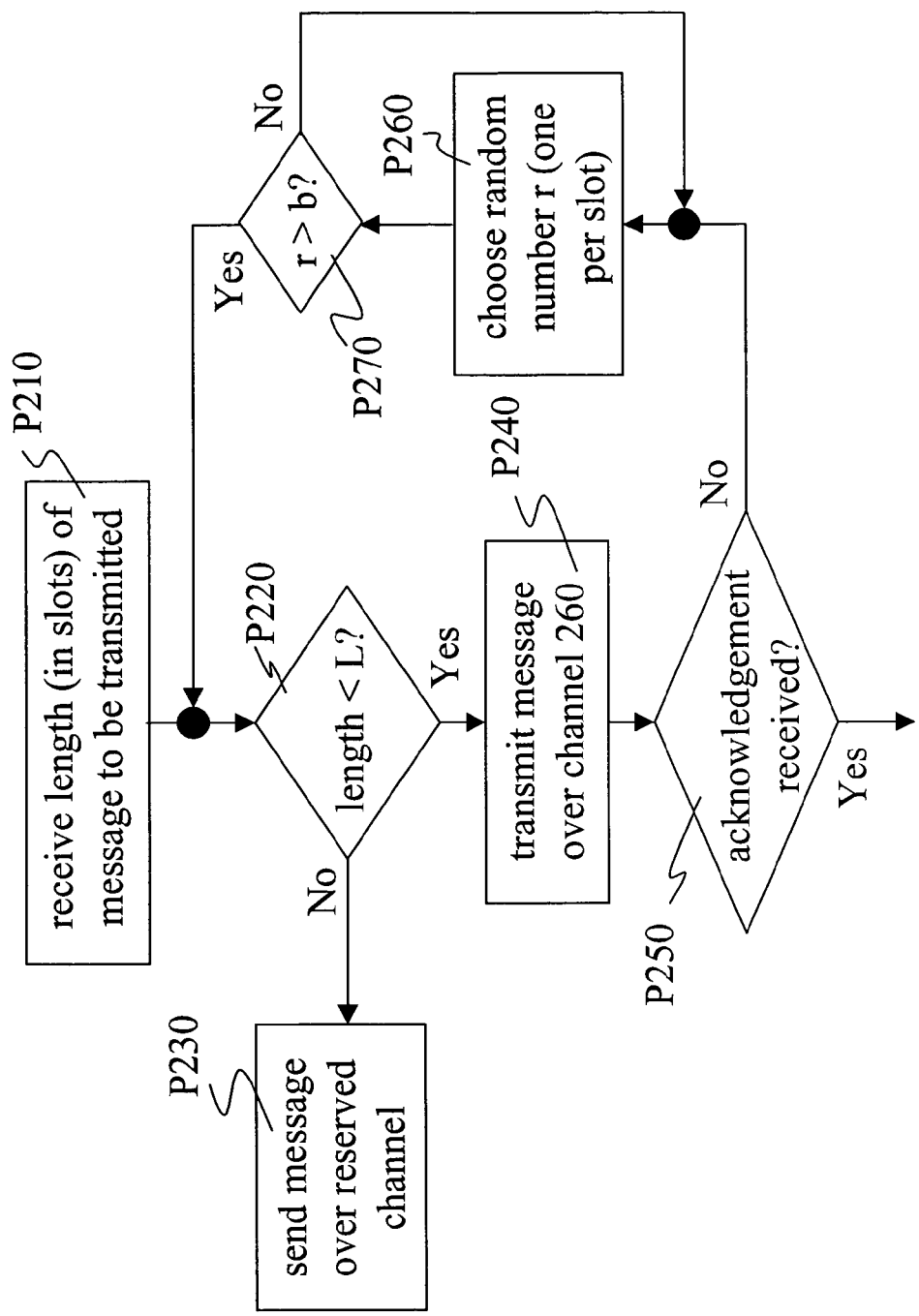
FIG. 8 is a flow chart for a method according to an embodiment of the invention.

FIG. 8 shows a flow chart for a method according to an embodiment of the invention that may be performed by a node 110 within system 60. In task P210, the length in slots of a message to be transmitted is received. In task P220, this length is tested against a message length threshold L that may be computed within network 210 and transmitted to node 110 as described above. If the test fails (i.e. the length is greater than the threshold), then the message is transmitted over a reserved access channel (e.g. channel 252*b*) in task P230. Otherwise, the message is transmitted over a basic access channel (e.g. channel 252*a*) in task P240.

If no acknowledgement to the transmission of task P240 is received in task P250 (e.g. if a timeout occurs), then a persistence process may be performed as follows. In task P260, a random number r is selected from a predetermined range. In task 270, the number r is compared to a persistence parameter (e.g. retransmission probability b) that is from the same predetermined range and that may be computed within network 210 and transmitted to node 110 as described above. If the test succeeds (e.g. r>b), then retransmission is performed in task P220. Otherwise, another value for random number r is selected in task P260, and the test of task P270 is repeated for the next slot. Many other persistence processes may be supported by methods according to alternative embodiments of the invention.

Figure 9:
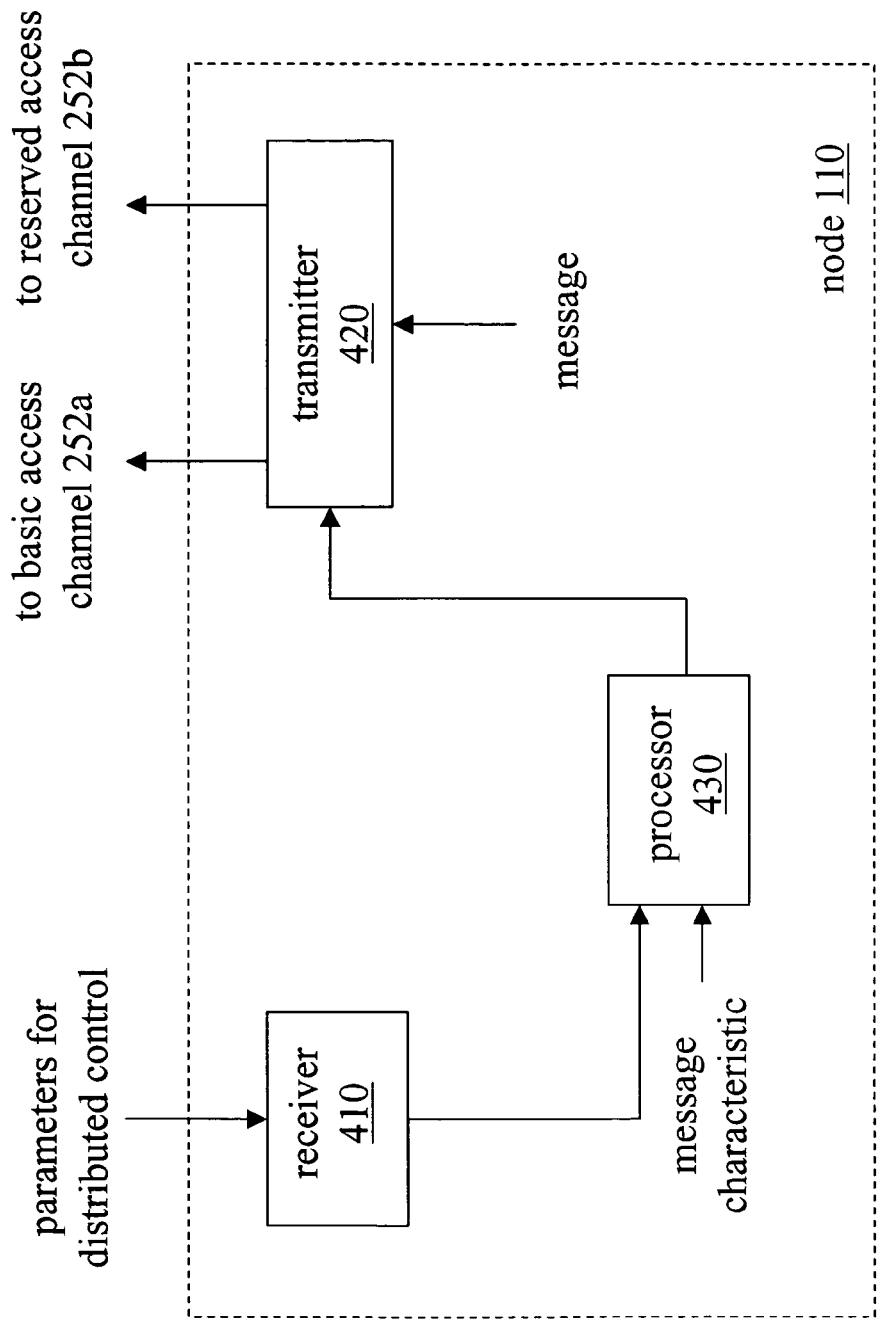
FIG. 9 shows a block diagram for an apparatus according to an embodiment of the invention.

FIG. 9 shows a block diagram for a node 110 according to an embodiment of the invention. Receiver 410 receives parameters for distributed control (e.g. from network 210) which may include one or more distribution parameters and/or persistence parameters. In an exemplary implementation, the parameters include threshold L and probability b as described above.

Processor 420 receives a characteristic of a message (e.g. the length of the message in slots) and outputs a choice to transmitter 430, where the choice depends on a relation between the characteristic and a distribution parameter (e.g. L). According to the choice, transmitter 430 transmits the message over basic access channel 252*a* or reserved access channel 252*b*. For example, the choice may indicate transmission over reserved access channel 252*b* if the message length is greater than L, and transmission over basic access channel 252*a* otherwise.

If no acknowledgement of a transmission over basic access channel 252*a* is received, processor 420 generates a random number for comparison with a persistence parameter received via receiver 410. Depending on the result of this comparison, processor 420 may cause transmitter 430 to retransmit the message (e.g. if the random number is greater than the persistence parameter). Otherwise, processor 420 generates another random number and repeats the comparison after a suitable delay (e.g. during the next slot period). As noted above, many other persistence processes may be supported by apparatus according to alternative embodiments of the invention.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit or as a circuit configuration fabricated into an application-specific integrated circuit or field-programmable gate array. Likewise, the invention may be implemented in part or in whole as a firmware program loaded or fabricated into non-volatile storage (such as read-only memory or flash memory) as machine-readable code, such code being instructions executable by an array of logic elements such as a microprocessor or other digital signal processing unit.

Further, the invention may be implemented in part or in whole as a software program loaded as machine-readable code from or into a data storage medium such as a magnetic, optical, magnetooptical, or phase-change disk or disk drive; a semiconductor memory; or a printed bar code. Thus, the present invention is not intended to be limited to the embodiments shown above but rather is to be accorded the widest scope consistent with the principles and novel features disclosed in any fashion herein.

What is claimed is:

1. A method comprising:
receiving channel observation information;
computing at least one parameter for distributed control, said at least one parameter for distributed control including at least one distribution parameter, and said computing being based at least in part on said channel observation information; and
transmitting said at least one parameter for distributed control, wherein said at least one distribution parameter relates to a restriction on traffic over a basic access channel, said restriction being based at least in part on message length, and wherein said distribution parameter relates to distributing traffic among at least said basic access channel and a reserved access channel.

2. The method according to claim 1, wherein said channel observation information relates at least in part to activity on said basic access channel.

3. The method according to claim 1, wherein a time dimension of said basic access channel is divided into a series of adjacent and nonoverlapping slots, and
wherein said channel observation information relates at least in part to activity on said basic access channel during a predetermined one of said slots.

4. The method according to claim 1, wherein said at least one parameter for distributed control includes at least one persistence parameter,
wherein said persistence parameter relates to retransmission of messages.

5. A node interface transmitter configured and arranged to transmit at least one parameter for distributed control to at least one among a plurality of nodes, wherein said at least one parameter for distributed control includes at least one distribution parameter and said at least one parameter for distributed control is based at least in part on channel observation information, and wherein said at least one distribution parameter relates to a restriction on traffic over a basic access channel, said restriction being based at least in part on message length, and wherein said distribution parameter relates to distributing traffic among at least said basic access channel and a reserved access channel.

6. The node interface transmitter according to claim 5, wherein said channel observation information relates at least in part to activity on said basic access channel.

7. The node interface transmitter according to claim 5, wherein a time dimension of said basic access channel is divided into a series of adjacent and nonoverlapping slots, and
wherein said channel observation information relates at least in part to activity on said basic access channel during a predetermined one of said slots.

8. The node interface transmitter according to claim 5, wherein said at least one parameter for distributed control includes at least one persistence parameter,
wherein said persistence parameter relates to retransmission of messages.

9. A system comprising:
a node interface transmitter to transmit at least one parameter for distributed control to at least one among a plurality of nodes, wherein said at least one parameter for distributed control includes at least one distribution parameter; and a node interface receiver to receive messages from at least one among the plurality of nodes over at least a basic access channel, wherein said at least one parameter for distributed control is based at least in part on channel observation information, and said channel observation information relates at least in part to said basic access channel, and wherein said at least one distribution parameter relates to a restriction on traffic over said basic access channel, said restriction being based at least in part on message length, and wherein said distribution parameter relates to distributing traffic among at least said basic access channel and a reserved access channel.

10. The system according to claim 9, wherein said channel observation information relates at least in part to activity on said basic access channel.

11. The system according to claim 9, wherein a time dimension of said basic access channel is divided into a series of adjacent and nonoverlapping slots, and wherein said channel observation information relates at least in part to activity on said basic access channel during a predetermined one of said slots.

12. The system according to claim 9, wherein said at least one parameter for distributed control includes at least one persistence parameter, wherein said persistence parameter relates to retransmission of messages.

13. A method comprising:

receiving at least one distribution and one persistence parameter;

receiving at least one characteristic of a message;

choosing one among at least a basic access channel and a reserved access channel, said choosing being based at least in part on a relation between said at least one characteristic and said at least one distribution parameter;

transmitting said message over said chosen channel; and retransmitting said message, wherein said retransmitting occurs at least in part according to said at least one persistence parameter.

14. The method according to claim 13, wherein said at least one characteristic relates to at least a length of said message.

15. The method according to claim 13, said method further comprising generating at least one random number, wherein said retransmitting occurs at least in part according to a relation between said at least one random number and said at least one persistence parameter.

16. An apparatus comprising:

a transmitter to transmit a message over one among a basic access channel and a reserved access channel;

a receiver to receive at least one distribution parameter; and a processor to receive at least one characteristic of a message, wherein said processor further chooses one among at least said basic access channel and said reserved access channel, said choice based at least in part on a relation between said at least one characteristic and said at least one distribution parameter, and wherein said transmitter further transmits said message at least in part according to said choice; and wherein said receiver further receives at least one persistence parameter and said processor further causes said transmitter to retransmit said message at least in part according to said at least one persistence parameter.

17. The apparatus according to claim 16, wherein said at least one characteristic relates to at least a length of said message.

18. The apparatus according to claim 16, said processor further generates at least one random number, wherein said processor further causes said transmitter to retransmit said message at least in part according to a relation between said at least one random number and said at least one persistence parameter.

* * * * *